Figure 1:
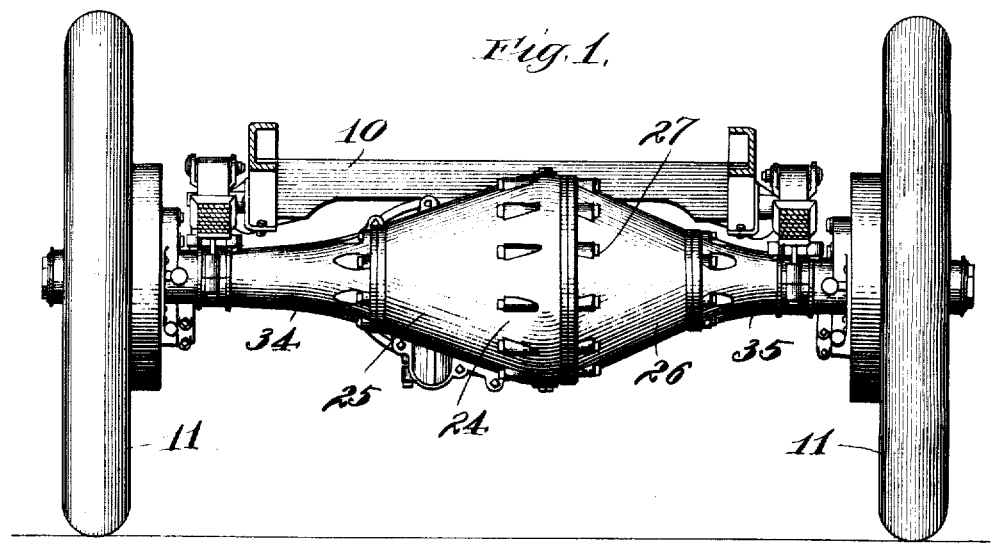

E. J. GULICK.
TRANSMISSION GEAR AND CASING FOR AUTOMOBILES.
APPLICATION FILED AUG. 9, 1907.

904,774.

Patented Nov. 24, 1908.

Witnesses:
G. A. Vaubenschmidt
Walter M. Fuller

Inventor:
Edward J. Gulick
By Offield Towle & Linthicum
Attys

UNITED STATES PATENT OFFICE.

EDWARD J. GULICK, OF MISHAWAKA, INDIANA.

TRANSMISSION-GEAR AND CASING FOR AUTOMOBILES.

No. 904,774. Specification of Letters Patent. Patented Nov. 24, 1908.

Application filed August 9, 1907. Serial No. 387,911.

*To all whom it may concern:*

Be it known that I, EDWARD J. GULICK, a citizen of the United States, residing at Mishawaka, in the county of St. Joseph and State of Indiana, have invented certain new and useful Improvements in Transmission-Gear and Casings for Automobiles, of which the following is a specification.

My invention relates to improvements in the casings for the gearing of motor vehicles.

It also includes a new disposition and arrangement of washers or packings about the parts of the divided axle.

My improved casing which houses and surrounds the differential gear is in two parts, and is formed so as to provide a pair of oppositely-disposed pockets or cavities either of which is adapted to receive the body of oil in the casing when the axle or vehicle tips, thereby preventing its escape about the axle and wheels. It has been customary to surround each part of the divided axle with one or more washers to prevent the entrance of foreign substances and to prevent the escape of the lubricant from the casing about the gears. With such a construction the axle parts cannot be taken out without injury to or removal of the washers. I overcome this difficulty with my improved device by providing hubs on the equalizing gear casing or box within which the axle sections fit and the washers instead of fitting on the axle are on these hubs.

On the accompanying drawing, which forms a part of this specification, I have illustrated a preferred and desirable embodiment of my invention, like reference characters referring to the same parts throughout the views.

Figure 2:
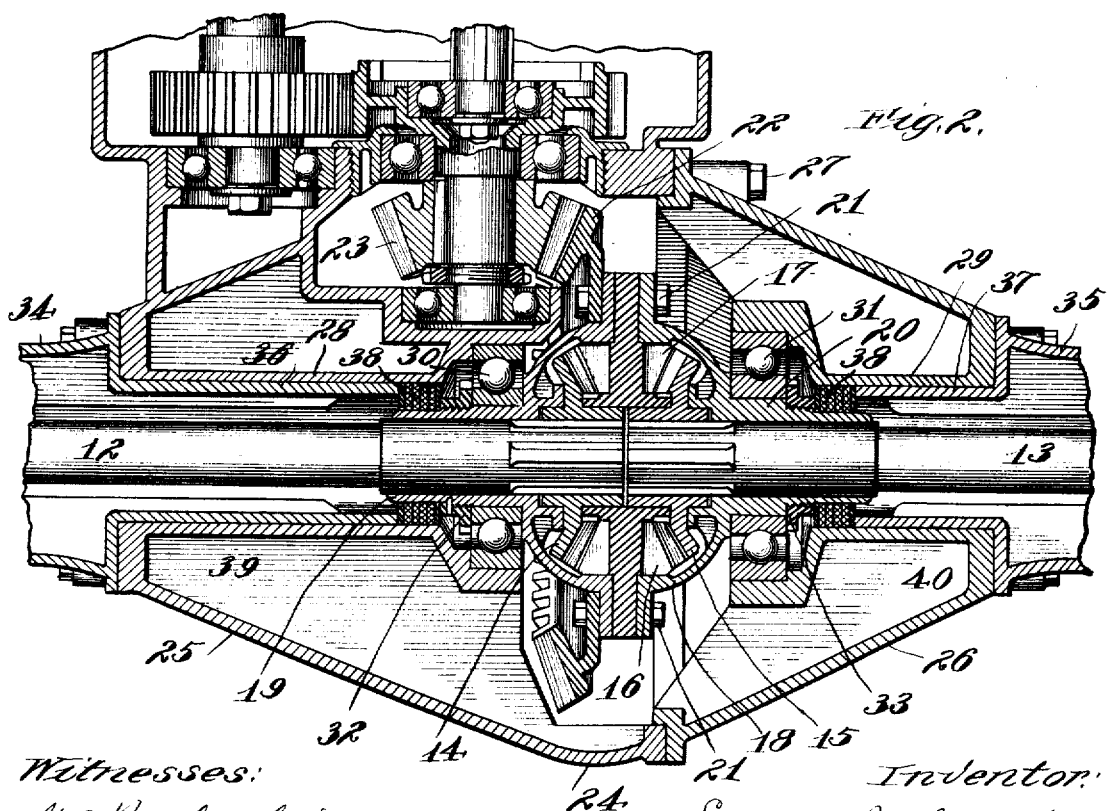

On said drawing Figure 1 is an elevation of the rear portion of an automobile showing the casing inclosing the rear axle and gearing; and Fig. 2 is a horizontal section through the casing on an enlarged scale.

The automobile, which includes the frame 10 and wheels 11, has a divided or sectional rear axle composed of the pair of parts 12 and 13. Splined or feathered on the adjacent ends of the axle sections 12 and 13 is a pair of bevel gears 14 and 15 meshing with which is a pair of intermediate equalizing pinions 16 and 17 rotatably mounted within the rotary differential gear casing or box 18, having at its opposite ends the outwardly-extended hollow hubs or sleeves 19 and 20. Fastened to the box or casing 18 by suitable bolts 21 is a comparatively large bevel gear 22 with which meshes a driving pinion 23. Inclosing the central portion of the divided axle is a two-part casing or housing 24, the two conical portions of which 25 and 26 are held together by suitable bolts 27. Each part 25 and 26 of the casing has a centrally-disposed, inwardly-extended, hollow hub or sleeve 28 and 29, respectively, the inner end portions of which are somewhat enlarged to accommodate the ball bearings 30 and 31 encircling and supporting the hubs or sleeves 19 and 20 and their inclosed axle sections 12 and 13 which fit neatly within them. Nuts 32 and 33 threaded on the hubs or sleeves 19 and 20 bear against the outer faces of the ball bearings and hold them in place against the opposite faces of the housing or casing 18.

The outer end portions of the axle sections are inclosed by casings 34 and 35 which bear against and are bolted to the opposite ends of the casing sections 25 and 26. Each of the housings 34 and 35 has a hollow cylindrical or tube-like extension 36 and 37, respectively, which fits within the tubes or sleeves 28 and 29, as is illustrated. Between the ends of these tubes or sleeves 36 and 37 and the nuts 32 and 33 I interpose a plurality of washers 38 which at their outer edges or peripheries contact with the inner cylindrical surface of the sleeves 28 and 29, and at their inner edges bear upon the hollow hubs 19 and 20 of the gear casing 18. It will be apparent that these washers or packings effectively prevent the entrance of foreign substances to the ball bearings and gears, and also prevent the escape of the lubricant. Owing to the fact that these washers or packings do not bear directly upon the axle sections 12 and 13, the latter may be readily withdrawn from the casing without in any way interfering with the washers. As is obvious, the axle sections can be as readily replaced without interfering with the parts mentioned.

The spaces between the outer walls of casings 25 and 26 and their inwardly-extended sleeves 28 and 29 provide pockets or compartments 39 and 40 each adapted to receive and hold the entire body of oil within the casing when the vehicle or axle is tipped or rocked sidewise, thereby preventing the escape of the oil about the axle sections and the wheels and brakes.

On the accompanying drawings and in the description given above I have indicated the general features of my invention, but it is not to be understood that the invention is limited and restricted to the precise details of construction shown and described, since they may be modified to a considerable extent without departure from the substance of my invention and without sacrificing its benefits and advantages.

I claim:

1. In a motor vehicle, the combination of axle-sections, differential gearing, a main casing about said gearing having inwardly-extended sleeves at its opposite ends surrounding said axle-sections, and end casings detachably fastened to the exterior of said main casing and having tubes or sleeves receiving said axle-sections and fitted in said main casing sleeves, substantially as described.

2. In a motor vehicle, the combination of axle sections, differential gearing, a rotary housing or box for said gearing having sleeves accommodating said axle sections, an inclosing or outer casing, and washers interposed between said casing and sleeves, substantially as described.

3. In a motor vehicle, the combination of axle sections, differential gearing, a rotary housing or box for said gearing having sleeves accommodating said axle sections, an inclosing outer casing, bearings for said sleeves in said casing, nuts on said sleeves to hold said bearings in place, casings for the outer ends of said axle sections having tubes extending into said inclosing casing and receiving said axle sections, and washers fitting over said sleeves and interposed between said nuts and tubes, substantially as described.

EDWARD J. GULICK.

Witnesses:
GEORGE W. HOYT,
J. R. AUSTIN.